(12) United States Patent
Song

(10) Patent No.: US 11,126,747 B2
(45) Date of Patent: Sep. 21, 2021

(54) APPARATUS AND METHOD FOR TRANSMITTING PERSONAL INFORMATION USING AUTOMATIC RESPONSE SYSTEM

(71) Applicant: Samsung Electronics Co., Ltd., Gyeonggi-do (KR)

(72) Inventor: Jihye Song, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/764,548

(22) PCT Filed: Jan. 8, 2019

(86) PCT No.: PCT/KR2019/000291
§ 371 (c)(1),
(2) Date: May 15, 2020

(87) PCT Pub. No.: WO2019/151667
PCT Pub. Date: Aug. 8, 2019

(65) Prior Publication Data
US 2020/0401724 A1 Dec. 24, 2020

(30) Foreign Application Priority Data
Jan. 31, 2018 (KR) .......................... 10-2018-0011901

(51) Int. Cl.
*G06F 21/62* (2013.01)
*G10L 15/26* (2006.01)
(Continued)

(52) U.S. Cl.
CPC .......... *G06F 21/6245* (2013.01); *G10L 15/26* (2013.01); *H04L 63/0861* (2013.01);
(Continued)

(58) Field of Classification Search
CPC ..... G06F 21/6245; G06F 21/32; G10L 15/26; H04L 63/0861; H04L 63/00; H04M 3/385;
(Continued)

(56) References Cited

U.S. PATENT DOCUMENTS 8,175,651 B2    5/2012   Rios et al.
8,553,859 B1 *   10/2013   Lavian ................ H04M 3/5166
                                                                 379/93.17
(Continued)

FOREIGN PATENT DOCUMENTS

KR   10-2007-0114505 A   12/2007
KR   10-1023909 B1     3/2011
(Continued)

OTHER PUBLICATIONS

European Search Report dated Nov. 6, 2020.

*Primary Examiner* — Akelaw Teshale
(74) *Attorney, Agent, or Firm* — Cha & Reiter, LLC

(57) ABSTRACT

An electronic device is disclosed. In addition, various embodiments recognized through the specification are possible. The electronic device includes a sensor, a processor operatively connected with the sensor, and a memory, operatively connected with the processor, including instructions. The instructions, when executed by the processor, cause the processor to perform biometric authentication for a user of the electronic device using the sensor, while a call connection procedure is performed with an ARS server, receive a voice signal for requesting private information of the user from the ARS server and convert the voice signal into text, and determine private information requested by the ARS server among at least one private information of the user, the at least one private information being previously stored in
(Continued)

the memory, based on the converted text, and transmit the determined private information to the ARS server.

20 Claims, 12 Drawing Sheets

(51) Int. Cl.
*H04L 29/06* (2006.01)
*H04M 3/38* (2006.01)
*H04M 3/42* (2006.01)
*H04M 3/51* (2006.01)

(52) U.S. Cl.
CPC ....... *H04M 3/385* (2013.01); *H04M 3/42059* (2013.01); *H04M 3/5191* (2013.01); *H04M 2201/41* (2013.01); *H04M 2203/6009* (2013.01)

(58) Field of Classification Search
CPC ........... H04M 3/42059; H04M 3/5191; H04M 2201/41; H04M 2203/6009; H04M 2203/6054; H04M 1/67; H04M 1/724; H04M 2250/74; H04M 2250/12; H04M 3/493; H04M 1/72403; G07C 9/37; H04W 12/06
See application file for complete search history.

(56) References Cited

U.S. PATENT DOCUMENTS

| | | | |
|---|---|---|---|
| 8,904,498 B2 | 12/2014 | Tootill et al. | |
| 9,215,321 B2 | 12/2015 | Timem et al. | |
| 9,560,188 B2 | 1/2017 | Kim et al. | |
| 9,609,134 B2 | 3/2017 | Timem et al. | |
| 9,838,541 B2 | 12/2017 | Brown | |
| 10,027,662 B1* | 7/2018 | Mutagi | G10L 15/22 |
| 10,165,097 B2 | 12/2018 | Jia | |
| 10,582,033 B2 | 3/2020 | You | |
| 2009/0154666 A1* | 6/2009 | Rios | G10L 15/26 |
| | | | 379/88.18 |
| 2010/0020946 A1* | 1/2010 | Jackson | G06Q 20/401 |
| | | | 379/88.04 |
| 2011/0047605 A1* | 2/2011 | Sontag | G06F 21/32 |
| | | | 726/7 |
| 2013/0262873 A1* | 10/2013 | Read | H04W 12/06 |
| | | | 713/186 |
| 2014/0109200 A1 | 4/2014 | Tootill et al. | |
| 2015/0334112 A1* | 11/2015 | Novack | H04M 3/38 |
| | | | 726/7 |
| 2016/0080558 A1 | 3/2016 | Kim et al. | |
| 2016/0219150 A1 | 7/2016 | Brown | |
| 2017/0337542 A1* | 11/2017 | Kim | G06F 3/048 |
| 2017/0339263 A1 | 11/2017 | Jia | |
| 2018/0032712 A1* | 2/2018 | Oh | H04L 9/3231 |
| 2019/0272365 A1* | 9/2019 | Huh | H04L 63/0853 |

FOREIGN PATENT DOCUMENTS

| | | |
|---|---|---|
| KR | 10-2014-0104232 A | 8/2014 |
| KR | 10-2015-0080952 A | 7/2015 |
| KR | 10-1639147 B1 | 7/2016 |
| KR | 10-1771013 B1 | 8/2017 |

* cited by examiner

APPARATUS AND METHOD FOR TRANSMITTING PERSONAL INFORMATION USING AUTOMATIC RESPONSE SYSTEM

CLAIM OF PRIORITY

This application is a National Phase Entry of PCT International Application No. PCT/KR2019/000291, which was filed on Jan. 8, 2019 and claims a priority to Korean Patent Application No. 10-2018-0011901, which was filed on Jan. 31, 2018, the contents of which are incorporated herein by reference.

TECHNICAL FIELD

Embodiments disclosed in the disclosure relate to an apparatus and method for transmitting private information to an automatic response system (ARS).

BACKGROUND ART

A user of an electronic device such as a smartphone may receive a service from a service provider via an automatic response system (ARS). In a state where a call is connected between the electronic device and an ARS server, the ARS server may request private information of the user before providing the service. The private information may include at least one of, for example, a resident registration number, a card number, an account number, a password, or a reservation number of the user.

DISCLOSURE

Technical Problem

When receiving a request for private information from an ARS server, a user of an electronic device may input his or her private information using a numeral keypad of a call application displayed on a display. The electronic device may transmit the private information input through the numeral keypad to the ARS server. The numeral keypad provided while the call application is running may not be encrypted. Because a number input through the numeral keypad of the call application is displayed on the display of the electronic device, private information input through the numeral keypad may be exposed to a third party. Furthermore, when the user of the electronic device does not remember his or her private information, he or she may experience the inconvenience of having to identify private information during a call.

In various embodiments of the disclosure, the electronic device may transmit previously stored private information of the user to the ARS server depending on biometric authentication information of the user.

In various embodiments of the disclosure, the electronic device may analyze a voice signal requested from the ARS server and may determine private information requested by the ARS server without a user input by comparing the analyzed voice signal with previously stored private information.

Technical Solution

In accordance with an aspect of the disclosure, an electronic device is provided. The electronic device may include a sensor module, a processor operatively connected with the sensor module, and a memory operatively connected with the processor, the memory including instructions. The instructions, when executed by the processor, may cause the processor to perform biometric authentication for a user of the electronic device using the sensor module, while a call connection procedure is performed with an ARS server, receive a voice signal for requesting private information of the user from the ARS server and convert the voice signal into text, and determine private information requested by the ARS server among at least one private information of the user, the at least one private information being previously stored in the memory, based on the converted text, and transmit the determined private information to the ARS server.

In accordance with another aspect of the disclosure, a method of an electronic device is provided. The method may include performing biometric authentication for a user of the electronic device, after a call connection procedure is performed with an ARS server, receiving a voice signal for requesting private information of the user from the ARS server and converting the voice signal into text, determining private information requested by the ARS server among at least one previously stored private information of the user, based on the converted text; and transmitting the determined private information to the ARS server.

In accordance with another aspect of the disclosure, an electronic device is provided. The electronic device may include a sensor module, a display, a processor operatively connected with the sensor module and the display, and a memory operatively connected with the processor, the memory including instructions. The instructions, when executed by the processor, may cause the processor to perform biometric authentication for a user of the electronic device using the sensor module, while a call connection procedure is performed with an ARS server, display a private information list being stored in the memory and including at least one private information on the display, when the biometric authentication is completed, receive a voice signal for requesting private information of the user from the ARS server and convert the voice signal into text, determine private information requested by the ARS server among at least one private information included in the private information list, based on the converted text, and transmit the determined private information to the ARS server.

Advantageous Effects

According to embodiments disclosed in the disclosure, the electronic device may prevent the risk of exposing private information by transmitting previously stored private information depending to biometric authentication information of the user.

According to embodiments disclosed in the disclosure, the electronic device may provide the user with convenience by transmitting previously stored private information to an ARS server without intervention of the user who inputs his or her private information.

In addition, various effects ascertained directly or indirectly through the present disclosure may be provided.

With regard to description of drawings, the same or similar denotations may be used for the same or similar components.

MODE FOR INVENTION

Hereinafter, various embodiments of the disclosure may be described with reference to the accompanying drawings. However, it should be understood that this is not intended to limit the disclosure to specific implementation forms and includes various modifications, equivalents, and/or alternatives of embodiments of the disclosure.

Figure 1:
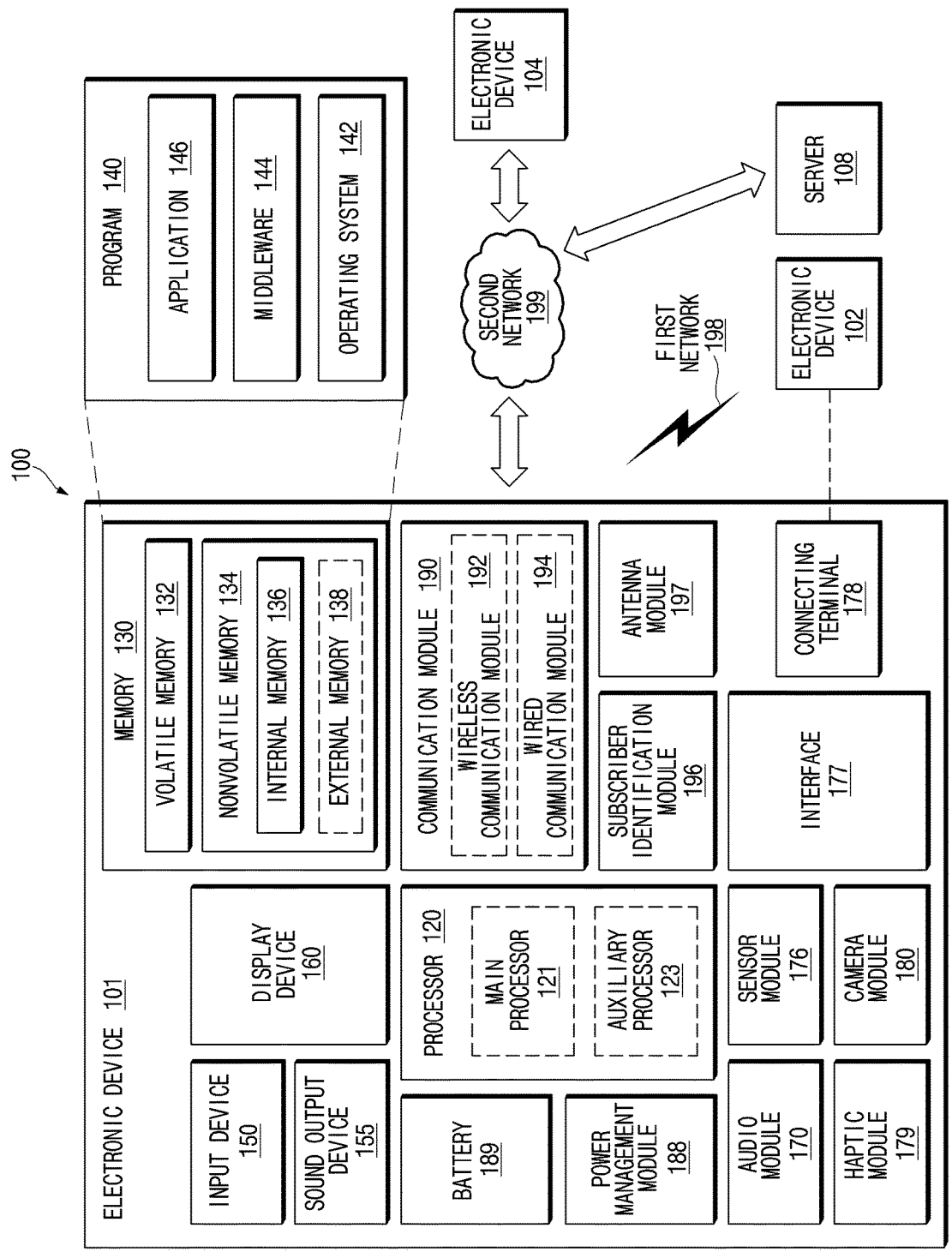
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
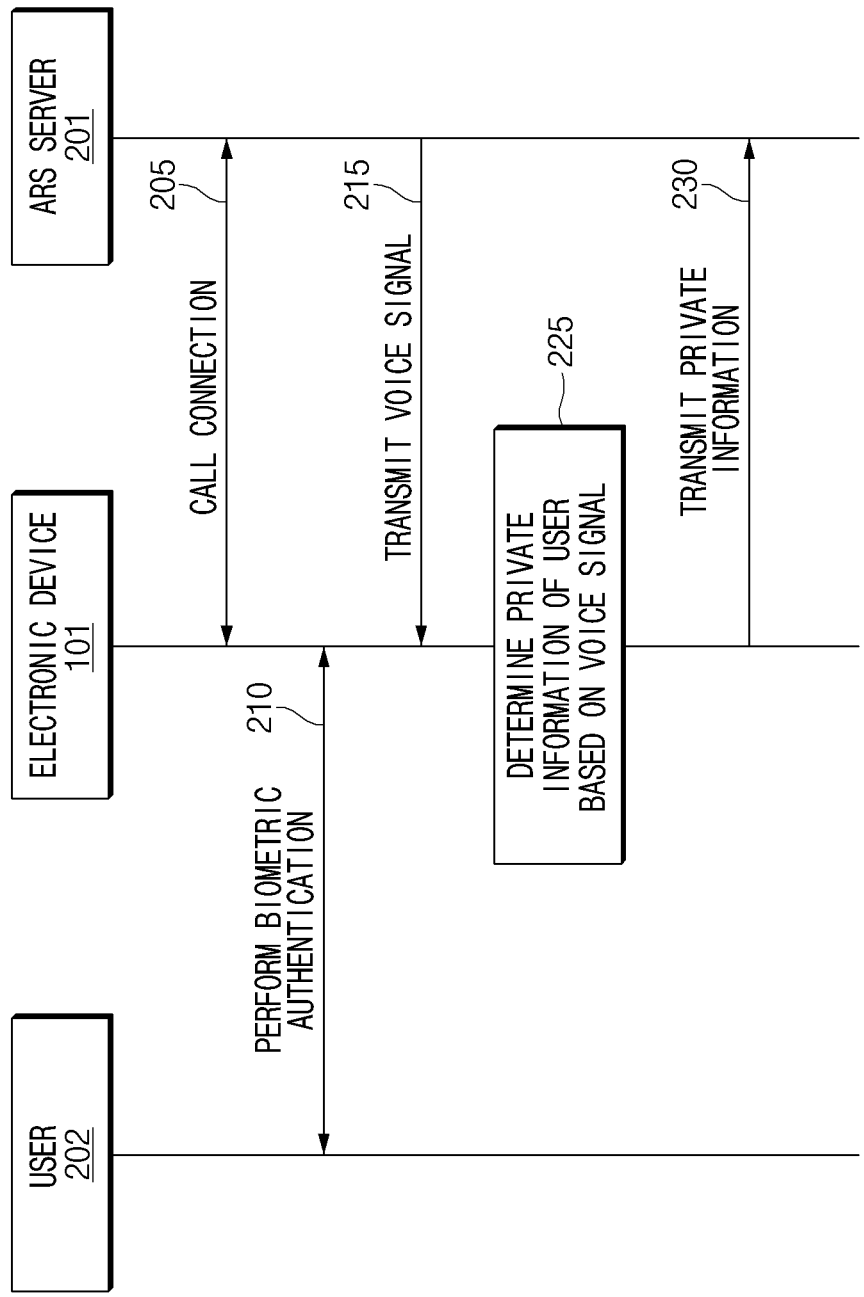
FIG. 2 illustrates a signal sequence diagram for transmitting private information between an electronic device and an ARS server according to various embodiments.

FIG. 2 illustrates a signal sequence diagram for transmitting private information between an electronic device and an ARS server according to various embodiments.

Referring to FIG. 2, an electronic device 101 (e.g., an electronic device 101 of FIG. 1) may include a portable device such as a smartphone, a tablet, or a wearable device. The electronic device 101 may support a voice call function (a call application). For example, when a call is connected between an electronic device 101 and an ARS server 201, a user 202 of the electronic device 101 may listen to an ARS voice over the electronic device 101.

According to an embodiment, the ARS server 201 may serve the user 202 with a voice by transmitting a voice signal to the electronic device 101. The ARS server 201 may vary with a type of a service provided by the ARS server 201. For example, the user 202 of the electronic device 101 may be served with a voice with respect to a bank, a card company, a communication company, a hospital, a restaurant, a production agency, or the like from the ARS server 201.

In operation 205, the electronic device 101 may perform a call connection procedure with the ARS server 201. The call connection procedure may refer to a procedure required to transmit and receive a voice signal between the electronic device 101 and the ARS server 201. The call connection procedure may include, for example, an operation where the electronic device 101 requests a call connection from the ARS server 201 and an operation where the ARS server 201 responds to the request. When the call is connected between the electronic device 101 and the ARS server 201, the electronic device 101 may receive a voice signal from the ARS server 201.

In operation 210, the electronic device 101 may perform biometric authentication for the user 202. According to an embodiment, the electronic device 101 may perform biometric authentication while the call connection procedure is performed or may perform the biometric authentication after the call connection procedure is completed. The biometric authentication procedure may refer to a procedure of identifying the user 202 using at least a portion of the body of the user 202, such as an iris, a fingerprint, or a face.

In operation 215, the electronic device 101 may receive a voice signal from the ARS server 201. According to an embodiment, the ARS server 201 may serve the user 202 with a voice signal. According to another embodiment, the ARS server 201 may request private information from the user 202 of the electronic device 101 using a voice signal. For example, when requesting a resident registration number of the user 202, the ARS server 201 may transmit a signal indicating the voice "please enter your resident registration number" to the electronic device 101. The private information may vary with a type of the ARS server 201 or a type of a service served from the ARS server 201 by the user 202. For example, the private information may include a resident registration number, a birth date, a mobile phone number, a bank account number, a card number, a reservation number, a password, or the like of the user 202.

In operation 225, the electronic device 101 may determine previously stored private information of the user 202 base on the received voice signal. According to an embodiment, the electronic device 101 may convert a voice signal received from the ARS server 201 into text and may determine private information corresponding to the converted text among at least one private information previously stored. According to an embodiment, the at least one private information previously stored may be stored in an area, encryption of which is set, among areas of a memory (e.g., a memory 130 of FIG. 1) of the electronic device 101.

In operation 230, the electronic device 101 may transmit the determined private information to the ARS server 201. According to an embodiment, the electronic device 101 may convert the private information into a digital signal and may transmit the converted digital signal to the ARS server 201.

Through the above-mentioned method, the electronic device 101 may provide the convenience of not having to enter the private information while the user 202 uses an ARS service. Furthermore, the electronic device 101 may strengthen security by transmitting the private information to the ARS server 201 depending on the biometric authentication.

According to an embodiment, a sequence and the number of operations of performing the biometric authentication are not limited to the example shown in FIG. 2. For example, the electronic device 101 may not perform the biometric authentication in operation 210 and may perform the biometric authentication before determining the private information (e.g., before operation 225). For another example, the electronic device 101 may not perform the biometric authentication in operation 210 and may perform the biometric authentication before transmitting the private information (e.g., before operation 230). For example, the electronic device 101 may perform biometric authentication in at least two or more of in operation 210, before operation 225, or before operation 230.

Figure 3:
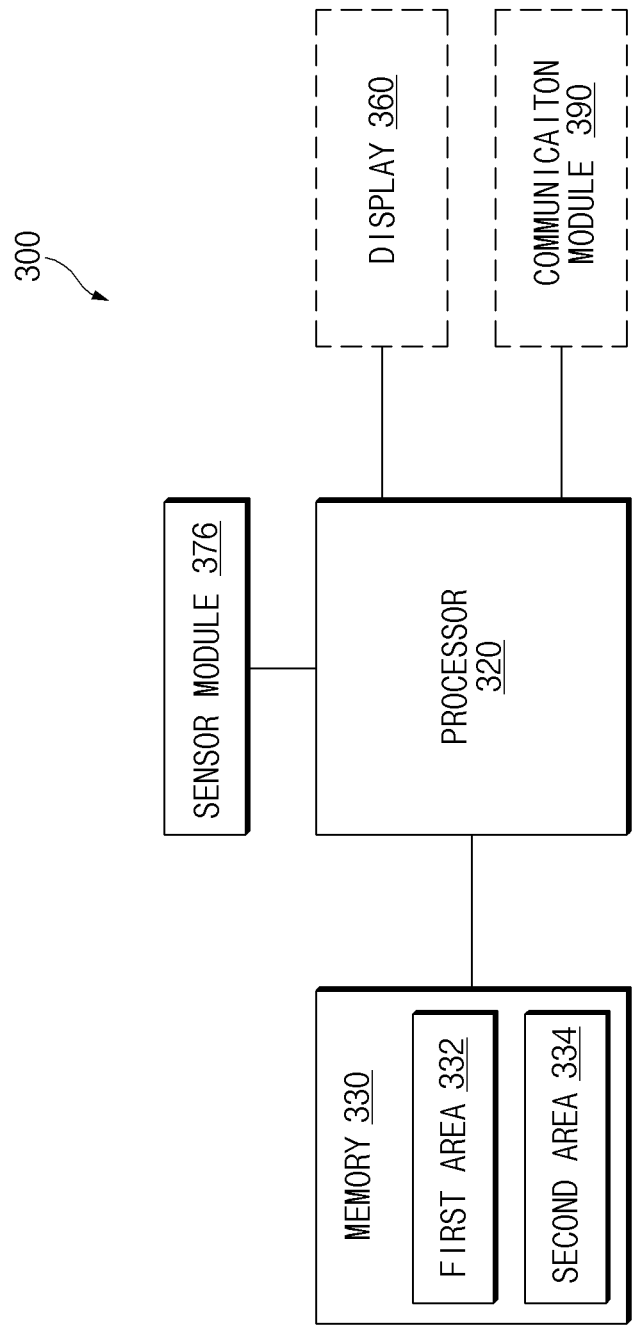
FIG. 3 illustrates a block diagram of an electronic device for transmitting private information based on biometric authentication and a voice signal according to various embodiments.

FIG. 3 illustrates a block diagram of an electronic device for transmitting private information based on biometric authentication and a voice signal according to various embodiments.

Referring to FIG. 3, an electronic device 300 (e.g., an electronic device 101 of FIG. 2) may include a processor 320 (e.g., a processor 120 of FIG. 1), a memory 330 (e.g., a memory 130 of FIG. 1), and a sensor module 376 (e.g., a sensor module 176 of FIG. 1). According to an embodiment, the electronic device 300 may further include at least one other component. For example, the electronic device 300 may further include a display 360 (e.g., a display device 160 of FIG. 1) configured to display an operation state of the electronic device 300. For another example, the electronic device 300 may further include a communication module 390 (e.g., a communication module 190 of FIG. 1) configured to transmit private information to an ARS server 201.

According to an embodiment, the sensor module 376 may sense biometric authentication information about a user 202. The sensor module 376 may include, for example, an iris sensor, a fingerprint sensor, or a camera sensor. According to an embodiment, the sensor module 376 may be embedded in the electronic device 300 or may be located outside the electronic device 300. According to an embodiment, the sensor module 376 may be one in number or one or more in number.

According to an embodiment, the electronic device 330 may include a volatile memory or a non-volatile memory. According to an embodiment, the memory 330 may include instructions used to cause the processor 320 to control components of the electronic device 300. For another example, the memory 300 may store biometric authentication information or private information of the user 202. For another example the memory 330 may store identification information of the ARS server 201.

According to an embodiment, the memory 330 may include a first area 332 and a second area 334. The first area 332 may include software (e.g., a program 140 of FIG. 1) or instructions for causing the processor 320 to perform a function of the electronic device 300. The second area 334 may refer to a space encrypted in hardware or software (e.g., an application, middleware, or an operating system). The electronic device 300 may strengthen security by storing biometric authentication or private information of the user 202 in the second area 334.

According to an embodiment, the display 360 may display an operation state of the electronic device 300. For example, the display 360 may display a user interface (UI) for requesting biometric authentication of the user 202, a UI indicating that the biometric authentication is completed, or a UI for identifying whether to store an identification number of the ARS server 201 or private information. According to an embodiment, the display 360 may include a touch sensor, a pressure sensor, or a fingerprint sensor.

According to an embodiment, the communication module 390 may process a signal received from the ARS server 201 and a signal transmitted to the ARS server 201. For example, the communication module 390 may process a voice signal received from the ARS server 201. For another example, the communication module 309 may convert the private information of the user 202 into a digital signal and may transmit the converted digital signal into the ARS server 201.

According to an embodiment, the processor 320 may be operatively connected with the memory 330, the sensor module 376, the display 360, and the communication module 390. The processor 320 may control other components to perform an overall operation for transmitting the private information of the user 202 to the ARS server 201. For example, the processor 320 may perform biometric authentication through the sensor module 376. For another example, the processor 320 may receive a voice signal from the ARS server 201 via the communication module 390. The processor 320 may convert the received voice signal into text. For another example, the processor 320 may compare information indicated by the converted text with information stored in the memory 330 (or the second memory 334 of the memory 330) to determine private information requested by the ARS server 201. For another example, the processor 320 may fetch the determined private information from the memory 330 and may transmit the private information to the ARS server 201 via the communication module 390. For another example, the processor 320 may display the determined private information on the display 360. For another example, the processor 320 may store private information, biometric authentication information, or identification information of the ARS server 201 in the memory 330 or may fetch it from the memory 330.

Figure 4:
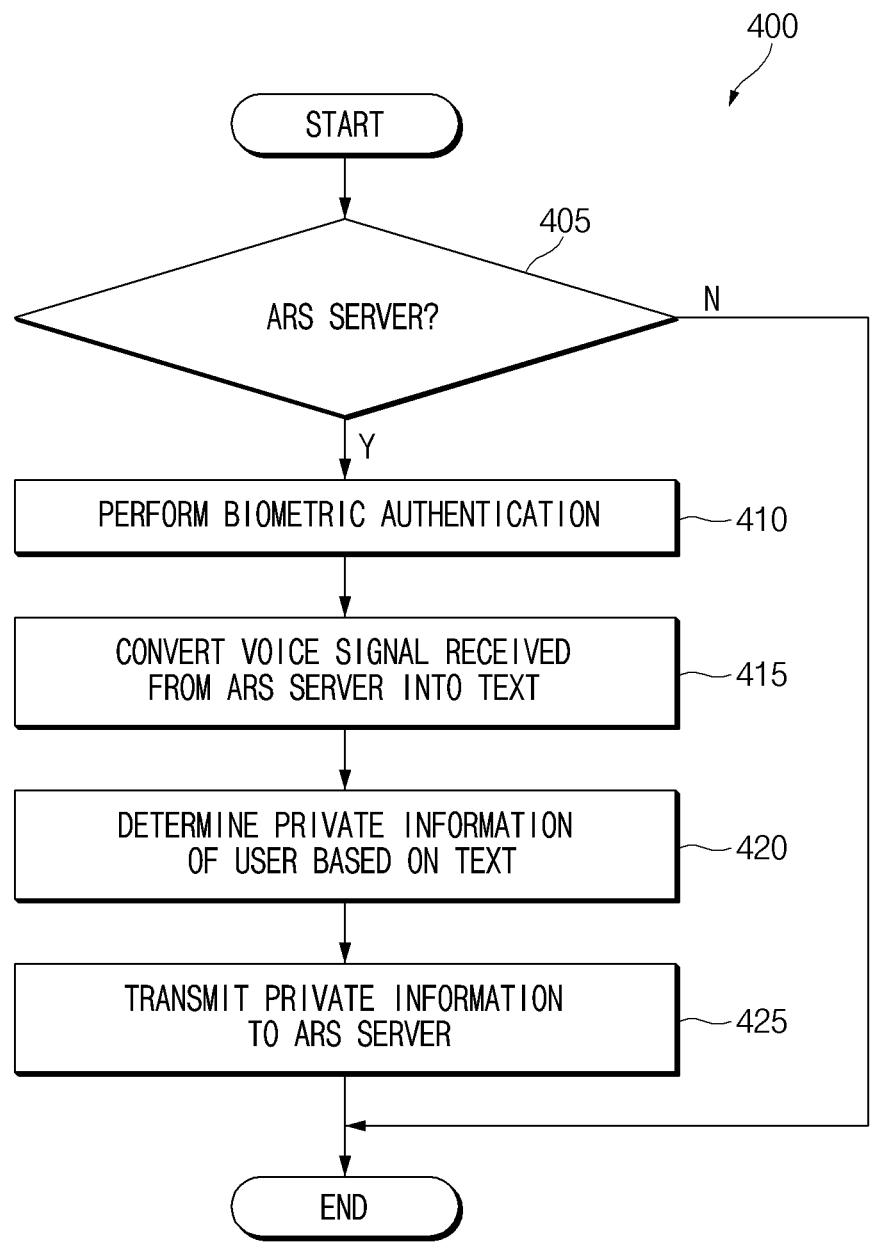
FIG. 4 illustrates an operational flowchart of an electronic device for transmitting private information based on biometric authentication and a voice signal according to various embodiments.

FIG. 4 illustrates an operational flowchart of an electronic device for transmitting private information based on biometric authentication and a voice signal according to various embodiments. Operations shown in FIG. 4 may be implemented by an electronic device 300 or a processor 320.

Referring to FIG. 4, in operation 405 of method 400, the processor 320 may identify whether a server which performs a call connection procedure with the electronic device 300 is an ARS server. According to an embodiment, the electronic device 320 may identify whether the server which performs the call connection procedure is the ARS server while the call connection procedure is performed or may identify whether the server which performs the call connection procedure is the ARS server after the call connection procedure is completed. According to an embodiment, the processor 320 may identify whether the server which performs the call connection procedure is the ARS server, based on previously stored identification information of the ARS server. The identification information may include, for example, a telephone number or an Internet protocol (IP) address of an ARS service. When the server which performs the call connection procedure is not the ARS server, the processor 320 may end the algorithm. When the server which performs the call connection procedure is the ARS server, the processor 320 may implement operation 410.

In operation 410, the processor 320 may perform biometric authentication for a user 202 of the electronic device 300. According to an embodiment, the processor 320 may automatically perform biometric authentication when the call connection procedure is initiated or when the call connection procedure is completed. According to another embodiment, the processor 320 may perform biometric authentication in response to a user input for starting the biometric authentication. The processor 320 may perform biometric authentication using at least one of, for example, an iris sensor, a fingerprint sensor, or an image sensor.

In operation 415, the electronic device 320 may convert a voice signal received from the ARS server 201 into text. The voice signal received from the ARS server 201 may include, for example, a voice signal for requesting private information of a user. The operation of converting a voice signal into text may be numerous. For example, the processor 320 may extract a feature (e.g., at least one of a frequency, a tone, a wavelength, energy, zero crossing, linear predictive coding (LPC)) of the received voice signal, may analyze the voice signal by comparing the extracted feature of the voice signal with a database previously store in the memory 330 (or another external server), and may convert the analyzed voice into text. For another example, the processor 320 may analyze a voice signal based on a hidden Markrov model (HMM) technique and may convert the analyzed voice signal into text. The processor 320 may update a feature of a voice signal stored in the memory 330 (or another external server) based on a deep neural networks (DNN) model.

In operation 420, the processor 320 may determine private information of the user 202, which is requested by the ARS server 201, based on the converted text. According to an embodiment, the processor 320 may determine private information by identifying whether there is private information corresponding to the converted text among at least one private information previously stored. According to an embodiment, the at least one private information may be stored in a second area 334, encryption of which is set, among areas of the memory 330.

In operation 425, the electronic device 320 may transmit the determined private information to the ARS server 201. According to an embodiment, the processor 320 may convert the determined private information into a digital signal and may transmit the digital signal to the ARS server 201 via the communication module 390.

Figure 5:
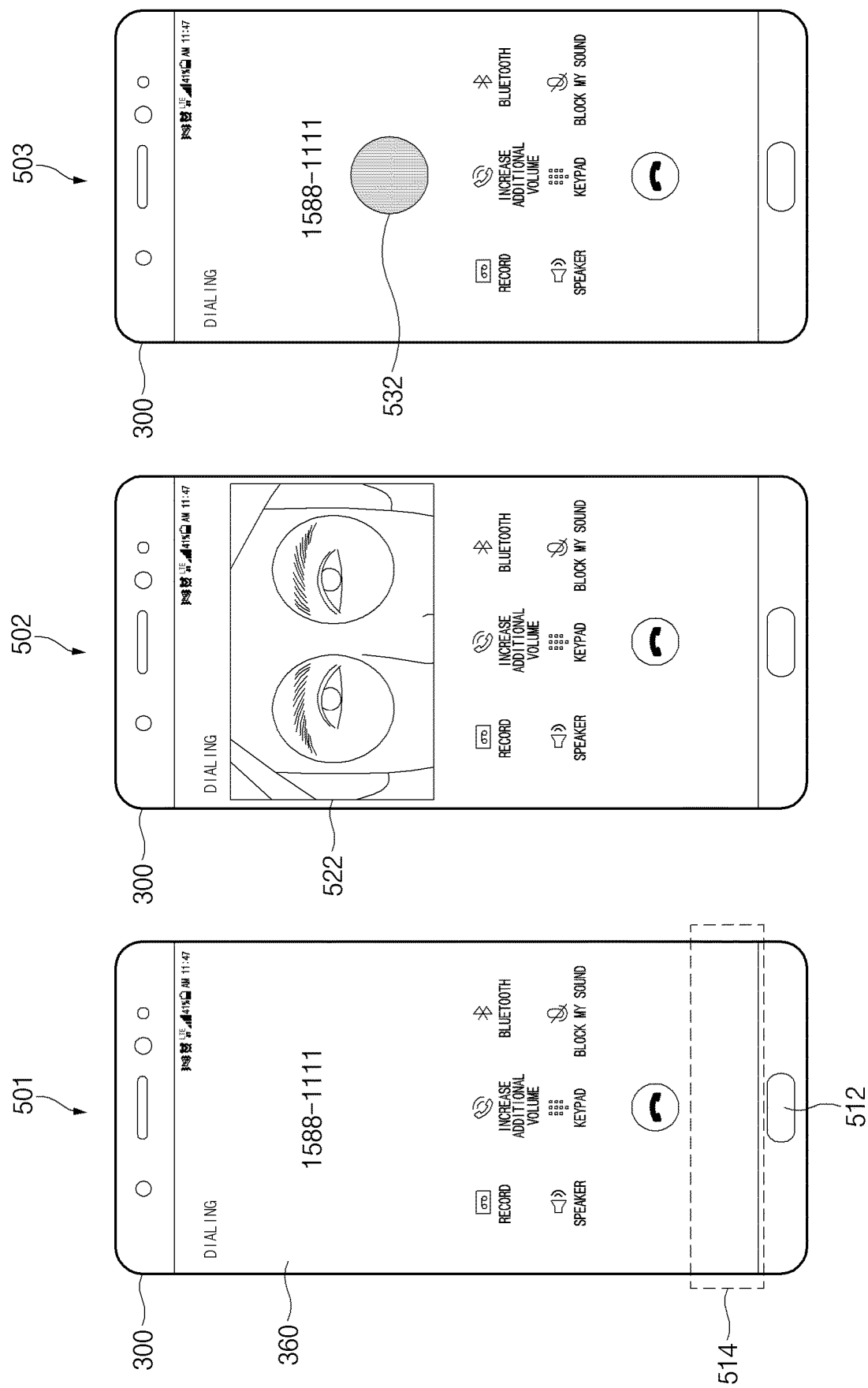
FIG. 5 illustrates an operation of performing biometric authentication according to various embodiments.

FIG. 5 illustrates an operation of performing biometric authentication according to various embodiments.

Referring to FIG. 5, while a call connection procedure is performed with an ARS server 201 or after the call connection procedure is completed with the ARS server 201, an electronic device 300 may display a screen 501 indicating that the electronic device 300 is during a call on a display 360.

According to an embodiment, when a server which performs the call connection procedure with the electronic device 300 is an ARS server, while the screen 501 is displayed, the electronic device 300 may perform biometric authentication for a user 202. For example, the electronic device 300 may identify fingerprint recognition information of the user 202 using a fingerprint sensor. The fingerprint sensor may be located on a home button 512, may be located on a partial region of the display 360 (e.g., a region indicated by reference numeral 514), or may be located on a rear surface of the electronic device 300. For another example, the electronic device 300 may identify iris recognition information of the user 202 using an iris sensor, as shown in a screen 502. The electronic device 300 may display a region 522, causing irises of the user 202 to be recognized by the iris sensor, on the screen 502. Although not illustrated in FIG. 5, the electronic device 300 may perform biometric authentication by identifying information through face recognition of the user 202. For example, the electronic device 300 may obtain an image for a face of the user 202 using an image sensor and may perform biometric authentication by comparing the obtained image with previously stored face recognition information of the user 202.

According to an embodiment, the electronic device 300 may display an indicator indicating that the biometric authentication procedure is completed on the display 360. For example, the electronic device 300 may display a screen 503 including an indicator 532. FIG. 5 illustrates the example where the screen 503 including the indicator 532 is displayed after the biometric authentication procedure is completed, but the indicator 532 may be displayed before the biometric authentication is performed. For example, the electronic device 300 may display the indicator 532 on the display 360 to request biometric authentication. When the biometric authentication procedure is completed, the electronic device 300 may indicate that the biometric authentication procedure is completed by changing a color of the indicator 532.

Figure 6:
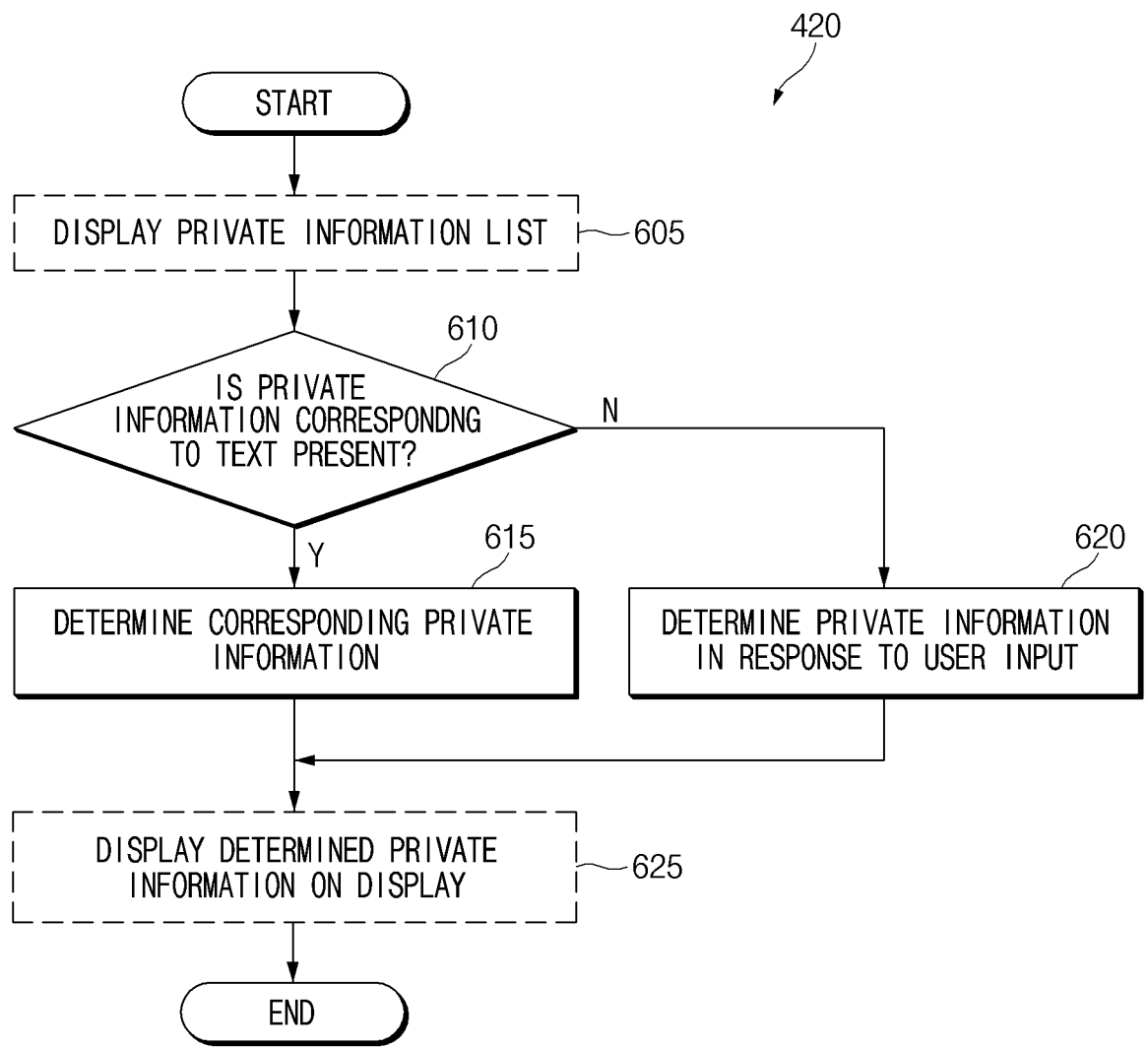
FIG. 6 illustrates an operational flowchart of an electronic device for determining private information based on a text converted from a voice signal according to various embodiments.

FIG. 6 illustrates an operational flowchart of an electronic device for determining private information based on text converted from a voice signal according to various embodiments. Operations shown in FIG. 6 may refer to operations where operation 420 of FIG. 4 is implemented in detail.

Referring to FIG. 6, in operation 605, a processor 320 may display a private information list including at least one private information on a display 360. According to an embodiment, the processor 320 may implement operation 610 without displaying the private information list.

In operation 610, the processor 320 may identify whether private information corresponding to text converted from a voice signal is present in a memory 330. When the private information corresponding to the converted text is present in the memory 330, the processor 320 may implement operation 615. When the private information corresponding to the converted text is not present in the memory 330, the processor 320 may implement operation 620.

In operation 615, the processor 320 may determine the private information corresponding to the text as private information requested by an ARS server 201. According to an embodiment, the processor 320 may fetch the determined private information from the memory 330 or a second area 334 of the memory 330.

In operation 620, the processor 320 may determine private information depending on a user input. For example, the processor 320 may determine private information depending on a user input for inputting a number keypad. For another example, when the private information list is displayed in operation 605, the processor 320 may determine private information depending on a user input for selecting one of at least one private information included in the private information list.

In operation 625, the electronic device 320 may display the determined private information on the display 360. For example, the processor 320 may display the determined private information in the form of a character. According to an embodiment, the processor 320 may end the algorithm of FIG. 6 without displaying the determined private information.

According to an embodiment, when the private information corresponding to the converted text is not stored in the memory 330, the processor 320 may update the private information list to store private information determined after implementing operation 625. For example, the processor 320 may include private information determined depending on the user input for inputting the number keypad in the private information list.

Figure 7A:
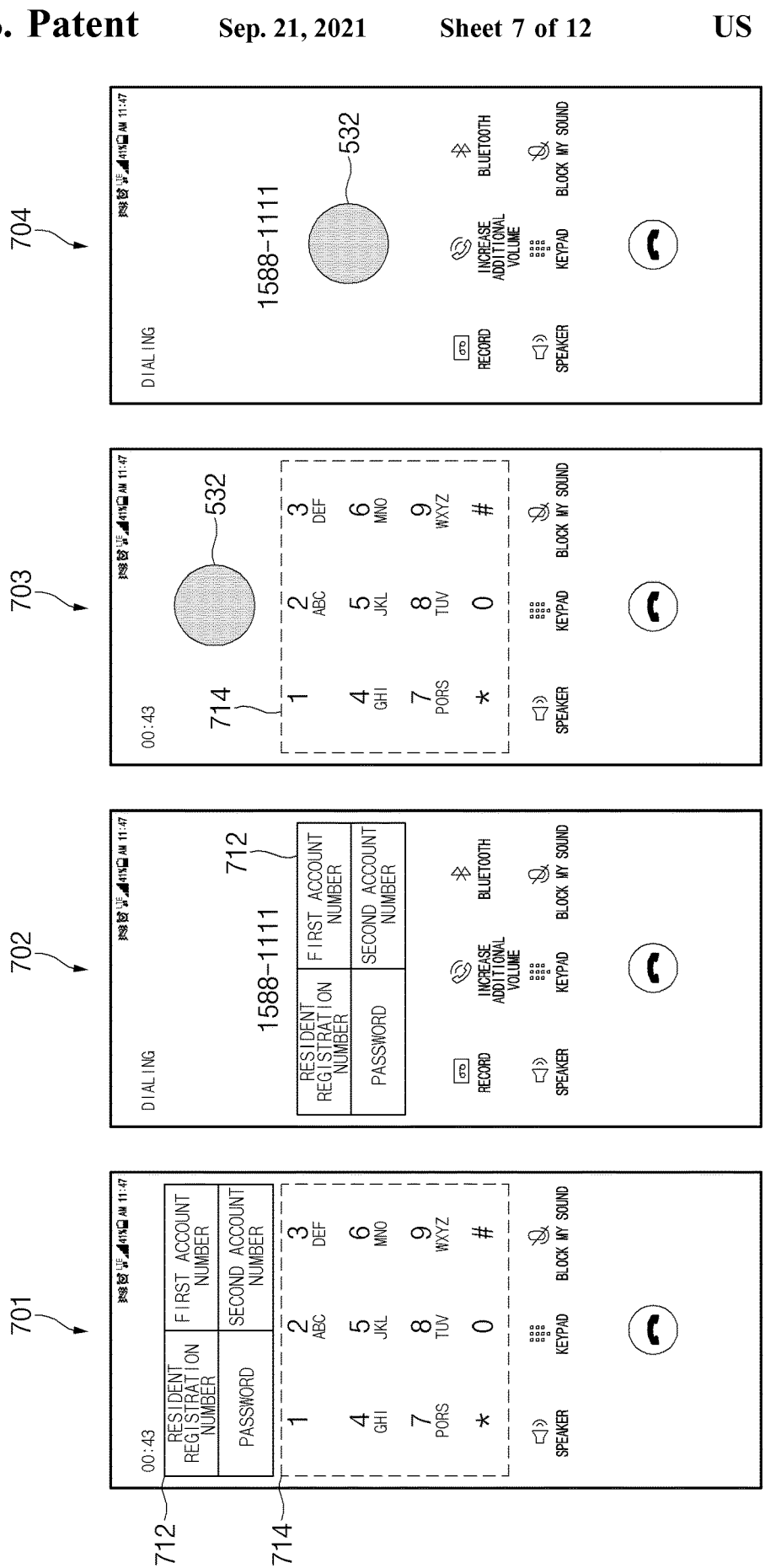
FIG. 7a illustrates a screen indicating an operation state of an electronic device in a state where a call is connected between the electronic device and an ARS server according to various embodiments.

FIG. 7a illustrates a screen indicating an operation state of an electronic device in a state where a call is connected between an electronic device and an ARS server according to various embodiments. An electronic device 300 may display an operation state of the electronic device 300 during a call with an ARS server 201 by displaying a private information list or an indicator on a display 360.

Referring to FIG. 7a, the electronic device 300 may display a private information list 712 including at least one private information on the display 360. In the disclosure, a type and the number of private information included in the private information list 712 are not limited to the example shown in FIG. 7a. According to an embodiment, the electronic device 300 may display the private information list 712 while a numeric keypad 714 is displayed as shown on a screen 701 or may display the private information list 712 while the numeral keypad 714 is not displayed as shown on a screen 702.

According to an embodiment, the electronic device 300 may display an indicator 532 rather than the private information list 712 on the display 360. For example, the electronic device 300 may display the indicator 532 while the numeric keypad 714 is displayed as shown on a screen 703 or may display the indicator 532 while the numeral keypad 714 is not displayed as shown on a screen 704. A form and a location of the indicator 532 are not limited to the example shown in FIG. 7a.

In embodiments described below, the electronic device 300 may implement an operation of the embodiments while the numeral keypad 714 is displayed on the screen and may implement the operation of the embodiments while the numeral keypad 714 is not displayed on the screen.

Figure 7B:
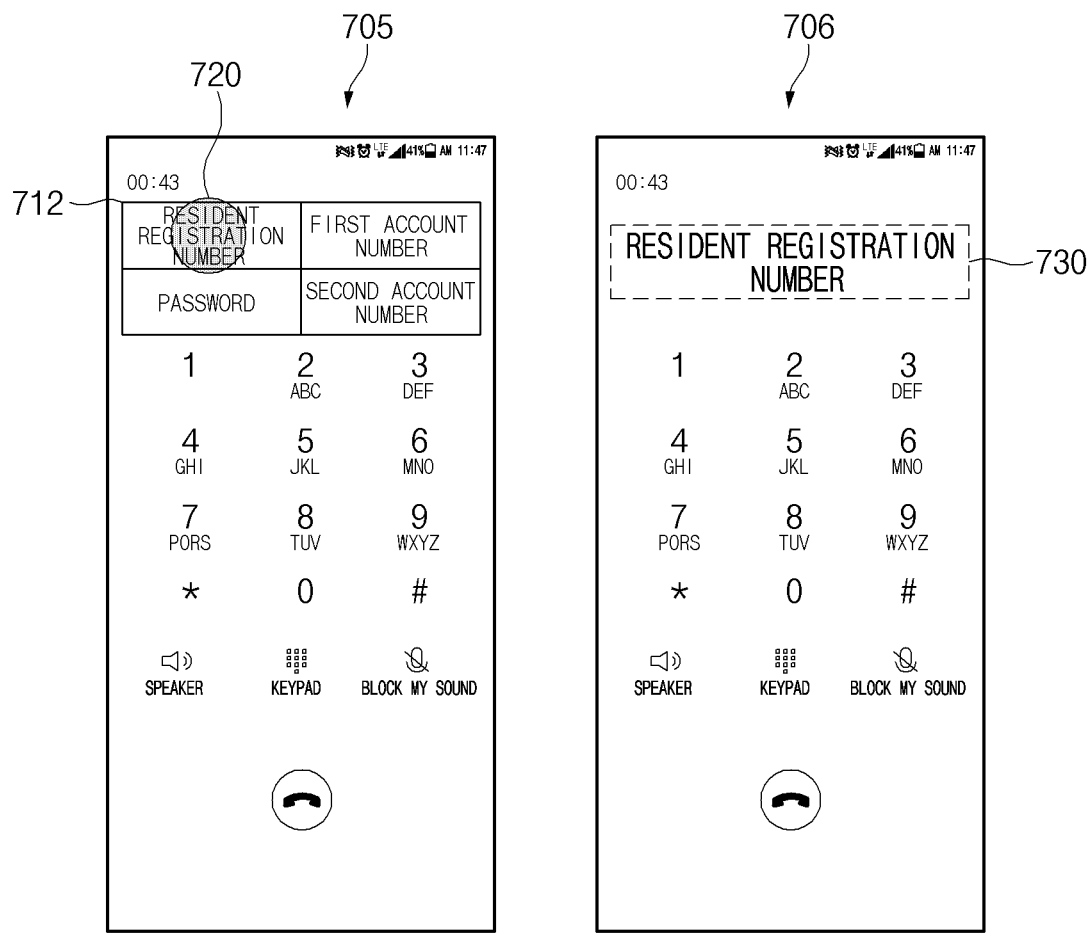
FIG. 7b illustrates a screen which displays private information requested by an ARS server according to various embodiments.

FIG. 7b illustrates a screen which displays private information requested by an ARS server according to various embodiments.

Referring to FIG. 7b, as shown in a screen 705, an electronic device 300 may display a private information list 712. When private information is determined based on a voice signal received from an ARS server 201, the electronic device 300 may display a UI 720 indicating the determined private information (e.g., "resident registration number") on the private information list 712. A form of the UI 720 is not limited to the example shown in FIG. 7b.

According to an embodiment, as shown in a screen 706, an electronic device 300 may display the determined private information in the form of a character. The private information displayed in the form of the character may be located on, for example, an upper end (e.g., a region of reference numeral 730) of a numeral keypad. According to an embodiment, when a user input for inputting the numeral keypad is received after the screen 706 is displayed, the electronic device 300 may display the input number on the region of reference numeral 730. For example, the input number may be displayed at the right of the private information displayed in the form of the character.

According to an embodiment, the electronic device 300 may display only one of the screen 705 and the screen 706 and may display the two screens in order. For example, after displaying the determined private information on the UI 720 as shown in the screen 705, the electronic device 300 may display the determined private information in the form of the character as shown in the screen 706. According to an embodiment, when an additional private information request is received from the ARS server 201, the electronic device 300 may display the screen 706 and may overlay and display the private information list 712 on the screen 704.

Figure 8:
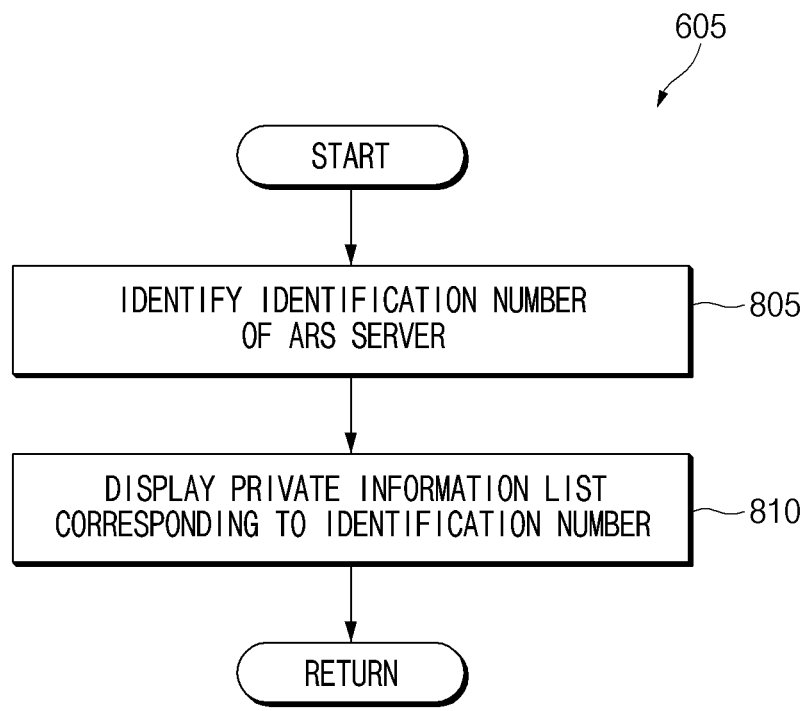
FIG. 8 illustrates an operational flowchart of an electronic device for displaying a private information list based on an identification number of an ARS server according to various embodiments.

FIG. 8 illustrates an operational flowchart of an electronic device for displaying a private information list based on an identification number of an ARS server according to various embodiments. Operations shown in FIG. 8 may refer to operations where operation 605 of FIG. 6 is implemented in detail.

Referring to FIG. 8, in operation 805, a processor 320 may identify an identification number of an ARS server 201. For example, the identification number may include a telephone number of an IP address of the ARS server 201. According to an embodiment, the identification number of the ARS server 201 may be previously stored in a memory 330. According to an embodiment, while an electronic device 300 performs a call connection procedure with an ARS server 201, the processor 320 may identify an identification number of the ARS server 201.

In operation 810, the processor 320 may display a private information list corresponding to the identification number of the ARS server 201 on a display 360. Through the above-mentioned method, the electronic device 300 may display different private information lists depending on an ARS server to which the call is connected. A user 202 may previously identify a candidate group of private information capable of being requested by an ARS server to which the call is currently connected, among a plurality of private information previously stored in the electronic device 300.

Figure 9:
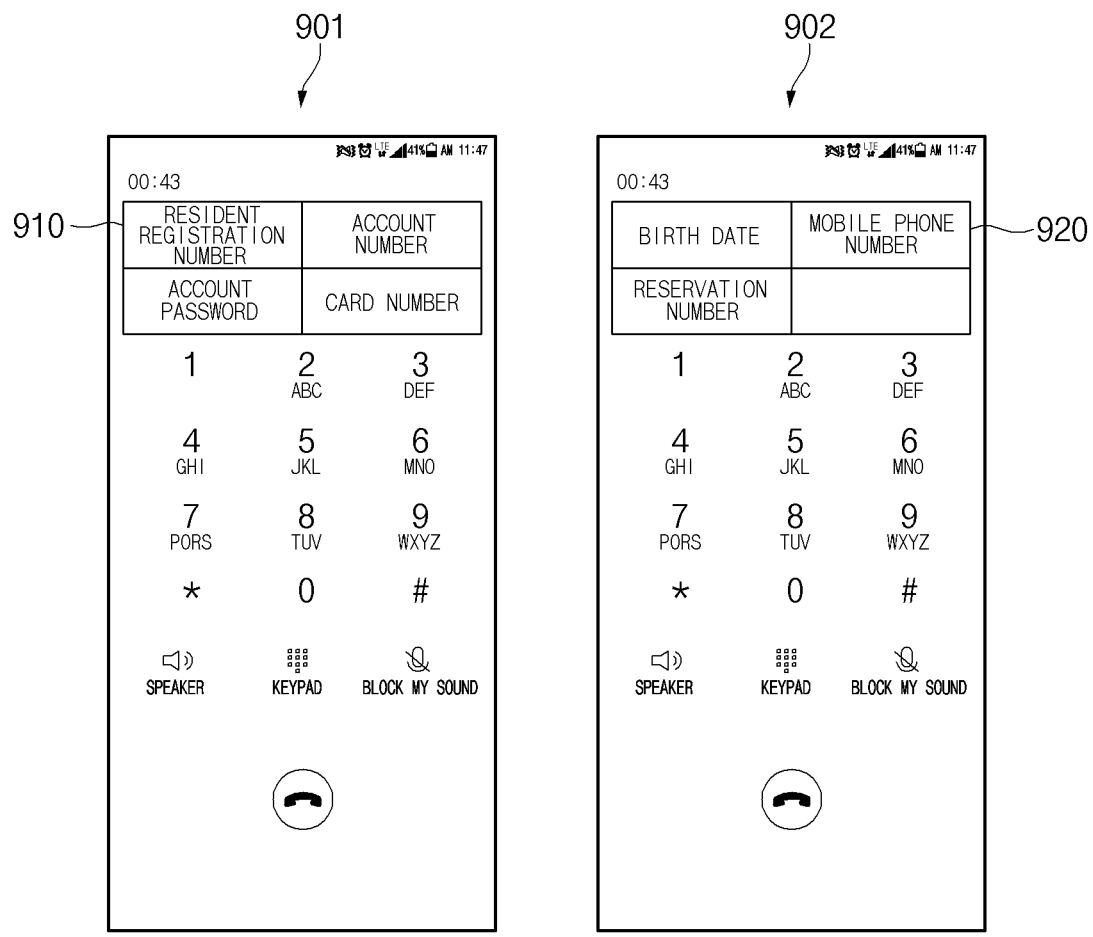
FIG. 9 illustrates a screen which displays a private information list based on an identification number of an ARS server according to various embodiments.

FIG. 9 illustrates a screen which displays a private information list based on an identification number of an ARS server according to various embodiments.

Referring to FIG. 9, as shown in a screen 901, when an identification number indicates an ARS server which provides a bank service, an electronic device 300 may display a private information list 910 associated with the ARS server which provides the bank service. For example, the private information list 910 may indicate at least one of a "resident registration number", an "account number", an "account password", and a "card number" in the form of a character. According to another embodiment, as shown in a screen 902, when an identification number indicates an ARS server which provides a reservation service, the electronic device 300 may display a private information list 920 associated with the ARS server which provides the reservation service. The private information list 920 may indicate at least one of, for example, a "birth date", a "mobile phone number", and a "reservation number" in the form of a character. According to an embodiment, the private information lists displayed on the screen 901 and the screen 903 are merely illustrative, and an embodiment is not limited to a type, the number, and a location of private information shown in FIG. 9.

According to an embodiment, a sequence of private information included in the private information list may be varied. The electronic device 300 may change a sequence of private information included in the private information list based on the frequency and priority of a plurality of private information transmitted to the ARS server. For example, when the frequency of private information transmitted to the ARS server which provides a bank service among the plurality of private information is high in an order of the "resident registration number", the "account number", the "account password", and the "card number", the electronic device 300 may arrange the private information list 910 in an order of private information, the frequency of which is high. For another example, the electronic device 300 may determine an order of private information located in the private information list based on priorities determined by user settings.

Figure 10:
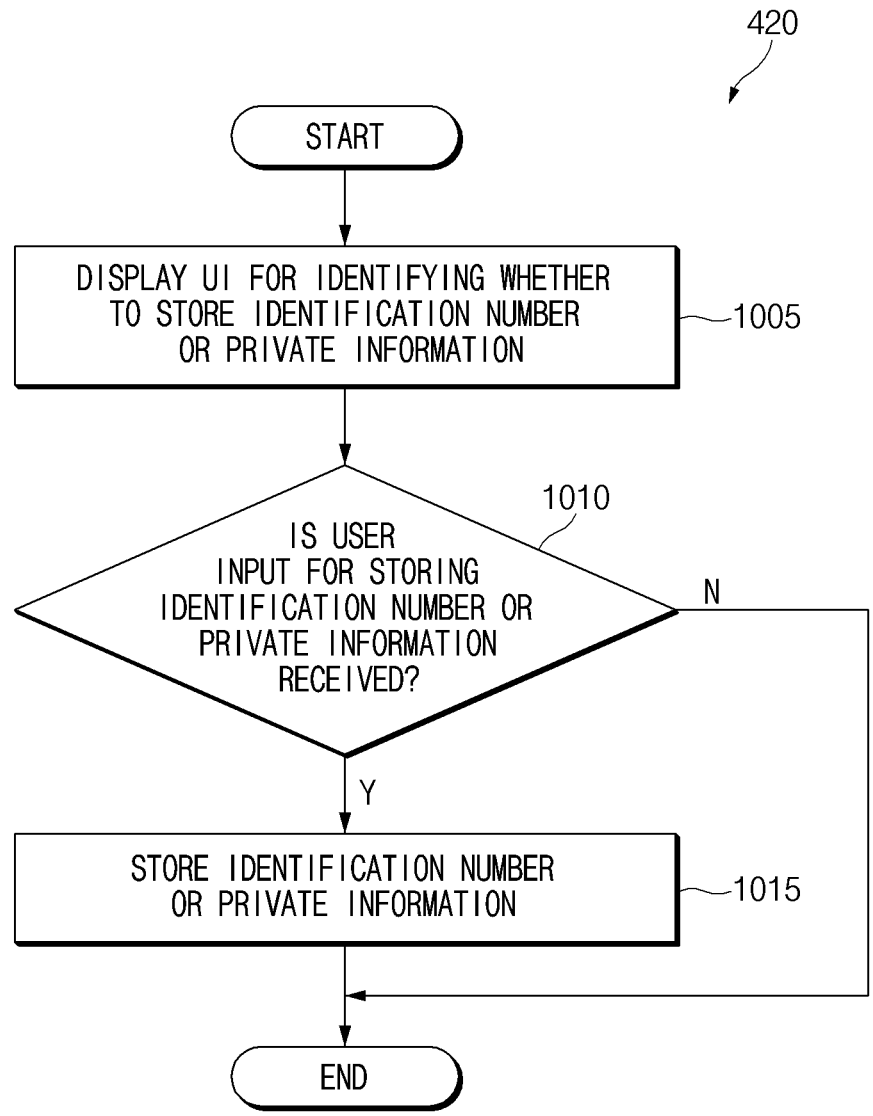
FIG. 10 illustrates an operational flowchart of an electronic device for storing an identification number of an ARS server or private information according to various embodiments.

FIG. 10 illustrates an operational flowchart of an electronic device for storing an identification number of an ARS server or private information according to various embodiments. Operations shown in FIG. 10 may refer to operations where operation 420 of FIG. 4 is implemented in detail.

Referring to FIG. 10, when an identification number of an ARS server 201 is not stored in a memory 330 or when private information requested by the ARS server 201 is not stored in the memory 330, in operation 1005, a processor 320 may display a UI for identifying whether to store the identification number or private information determined in operation 420 of FIG. 4 on a display.

In operation 1010, the processor 320 may identify whether a user input for storing the identification number or the private information is received. When the user input is not received or when a user input for not storing the identification number or the private information is received, the processor 320 may end the algorithm. When receiving the user input for storing the identification number or the private information, the processor 320 may implement operation 1015.

In operation 1015, the processor 320 may store the identification number of the ARS server 201 or the private information in the memory 330. According to an embodiment, the processor 320 may store the identification number or the private information in a second area 334, encryption of which is set, among areas of the memory 330.

Figure 11:
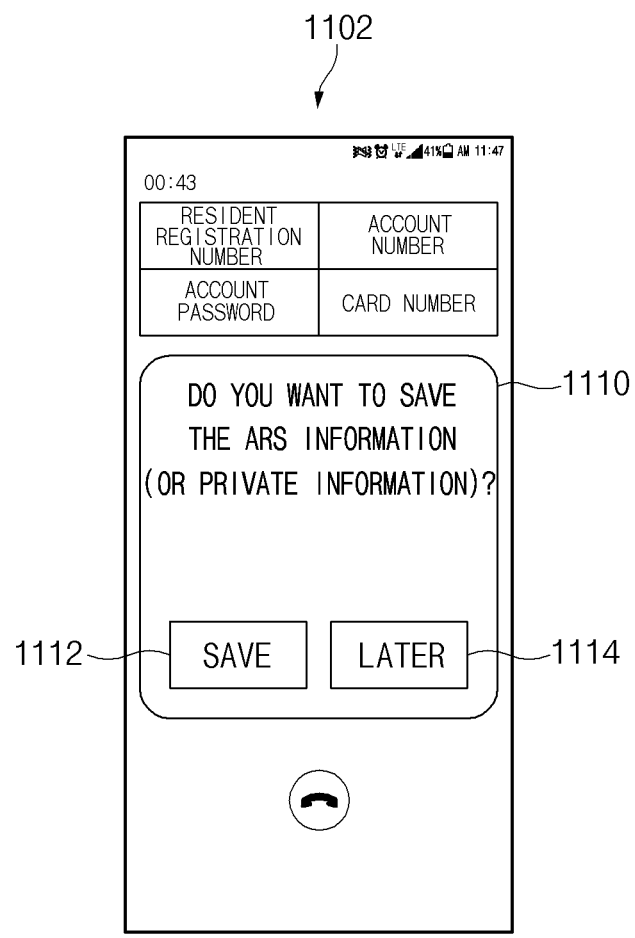
FIG. 11 illustrates a screen which displays a user interface (UI) for storing an identification number of an ARS server or private information according to various embodiments.

FIG. 11 illustrates a screen which displays a UI for storing an identification number of an ARS server or private information according to various embodiments.

Referring to FIG. 11, an electronic device 300 may display a UI 1110 for identifying whether to store an identification number of an ARS server 201 or private information while a screen 1102 is displayed. A location, a form, and a displayed time of the UI 1110 are not limited to the example shown in FIG. 11. For example, the UI 1110 may be overlaid and displayed with a private information list. For another example, the UI 1110 may be displayed after the call is ended.

According to an embodiment, the UI 1110 may include a button 1112 for storing identification number or private information and a button 1114 for not storing the identification number or the private information. When the button 1112 is selected, the electronic device 300 may store the identification number or the private information in the memory 330.

As described above, an electronic device (e.g., an electronic device 201 of FIG. 2) may include a sensor module (e.g., a sensor module 376 of FIG. 3), a processor (e.g., a processor 320 of FIG. 3) operatively connected with the sensor module, and a memory (e.g., a memory 330 of FIG. 3) operatively connected with the processor, the memory including instructions. The instructions, when executed by the processor, may cause the processor to perform biometric authentication for a user of the electronic device using the sensor module, while a call connection procedure is performed with an ARS server (e.g., an ARS server 201 of FIG. 2), receive a voice signal for requesting private information of the user from the ARS server and convert the voice signal into text, determine private information requested by the ARS server among at least one private information of the user, the at least one private information being previously stored in the memory, based on the converted text, and transmit the determined private information to the ARS server.

According to an embodiment, the processor may be configured to, when the instructions are executed, display a private information list previously stored in the memory on a display (e.g., a display 360 of FIG. 3) of the electronic device in determining the private information requested by the ARS server.

According to an embodiment, the processor may be configured to, when the instructions are executed, identify whether private information corresponding to the converted text is stored in the memory, after the private information list is displayed on the display, and determine the private information corresponding to the converted text, when the private information corresponding to the converted text is stored in the memory.

According to an embodiment, the processor may be configured to, when the instructions are executed, determine the private information in response to a user input for selecting one private information in the displayed private information list, when the private information corresponding to the converted text is not stored in the memory.

According to an embodiment, the processor may be configured to, when the instructions are be executed, update the private information list based on the private information corresponding to the user input.

According to an embodiment, the processor may be configured to, when the instructions are executed, identify an identification number of the ARS server and display the private information list corresponding to the identification number on the display.

According to an embodiment, the processor may be configured to, when the instructions are executed, display the determined private information on a display of the electronic device in the form of a character.

According to an embodiment, information about the biometric authentication or the private information may be configured to be stored in an area, encryption of which is set, among areas of the memory.

As described above, a method of an electronic device (e.g., an electronic device 201 of FIG. 2) may include performing biometric authentication for a user of the electronic device, after a call connection procedure is performed with an ARS server (e.g., an ARS server 201 of FIG. 2), receiving a voice signal for requesting private information of the user from the ARS server and converting the voice signal into text, determining private information requested by the ARS server among at least one previously stored private information of the user, based on the converted text, and transmitting the determined private information to the ARS server.

According to an embodiment, the method may further include indicating the at least one private information and displaying a previously stored private information list, in determining the private information requested by the ARS server.

According to an embodiment, the determining of the private information may include identifying whether private information corresponding to the converted text is stored in a memory of the electronic device, after the private information list is displayed, and determining the private information corresponding to the converted text, when the private information corresponding to the converted text is stored in the memory.

According to an embodiment, the method may further include determining the private information in response to a user input for selecting one private information in the displayed private information list, when the private information corresponding to the converted text is not stored in the memory.

According to an embodiment, the method may further include updating the private information list based on the private information corresponding to the user input.

According to an embodiment, the displaying of the private information list may include identifying an identification number of the ARS server and displaying the private information list corresponding to the identification number.

According to an embodiment, the method may further include displaying the determined private information in character form.

As described above, an electronic device (e.g., an electronic device 201 of FIG. 2) may include a sensor module (e.g., a sensor module 376 of FIG. 3), a display (e.g., a display 360 of FIG. 3), a processor (e.g., a processor 320 of FIG. 3) operatively connected with the sensor module and the display, and a memory (e.g., a memory 330 of FIG. 3) operatively connected with the processor, the memory including instructions. The instructions, when executed by the processor, may cause the processor to perform biometric authentication for a user of the electronic device using the sensor module, while a call connection procedure is performed with an ARS server (e.g., an ARS server 201 of FIG. 2), display a private information list being stored in the memory and including at least one private information, on the display, when the biometric authentication is completed, receive a voice signal for requesting private information of the user from the ARS server and convert the voice signal into text, determine private information requested by the ARS server among at least one private information included in the private information list, based on the converted text, and transmit the determined private information to the ARS server.

According to an embodiment, the processor may be configured to, when the instructions are executed, identify whether private information corresponding to the converted text is stored in the memory, after the private information list is displayed on the display, and determine the private information in response to a user input for selecting one private information in the private information list, when the private information corresponding to the converted text is not stored in the memory.

According to an embodiment, the processor may be configured to, when the instructions are executed, update the private information list based on the private information corresponding to the user input.

According to an embodiment, the processor may be configured to, when the instructions are executed, identify an identification number of the ARS server and display the private information list corresponding to the identification number.

According to an embodiment, the processor may be configured to, when the instructions are executed, display the determined private information in the form of a character.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a sensor;
a processor operatively connected with the sensor; and
a memory operatively connected with the processor, the memory including instructions,
wherein the instructions, when executed by the processor, cause the processor to:
perform biometric authentication for to identify a user of the electronic device using the sensor, while performing a call connection procedure with an ARS server;
receive a voice signal for requesting private information of the user from the ARS server and convert the voice signal into text;
determine private information requested by the ARS server among at least one private information of the user, the at least one private information being previously stored in the memory, based on the converted text; and transmit the determined private information to the ARS server depending on the biometric authentication.

2. The electronic device of claim 1, wherein the processor is configured to, when the instructions are executed:

display a private information list previously stored in the memory on a display of the electronic device in determining the private information requested by the ARS server.

3. The electronic device of claim 2, wherein the processor is configured to, when the instructions are executed:

identify whether private information corresponding to the converted text is stored in the memory, after the private information list is displayed on the display; and determine the private information corresponding to the converted text, when the private information corresponding to the converted text is stored in the memory.

4. The electronic device of claim 3, wherein the processor is configured to, when the instructions are executed:

determine the private information in response to a user input for selecting one private information in the displayed private information list, when the private information corresponding to the converted text is not stored in the memory.

5. The electronic device of claim 4, wherein the processor is configured to, when the instructions are executed:

update the private information list based on the private information corresponding to the user input.

6. The electronic device of claim 2, wherein the processor is configured to, when the instructions are executed:

identify an identification number of the ARS server; and display the private information list corresponding to the identification number on the display.

7. The electronic device of claim 1, wherein the processor is configured to, when the instructions are executed:

display the determined private information on a display of the electronic device in the form of a character.

8. The electronic device of claim 1, wherein information about the biometric authentication or the private information is configured to be stored in an area, encryption of which is set, among areas of the memory.

9. The electronic device of claim 1, wherein the memory stores biometric authentication information, and wherein, to perform the biometric authentication, the processor is configured to, when the instructions are executed:

sense biometric information of the user using the sensor; and compare the sensed biometric information with previously stored biometric authentication information.

10. The electronic device of claim 1, wherein the processor is configured to, when the instructions are executed:

automatically perform the biometric authentication when the call connection procedure is initiated or when the call connection procedure is completed.

11. The electronic device of claim 1, further comprising:

a display, wherein the converted text and the determined private information are absent on the display.

12. A method of an electronic device, the method comprising:

performing biometric authentication to identify a user of the electronic device, after a call connection procedure is performed with an ARS server;

receiving a voice signal for requesting private information of the user from the ARS server and converting the voice signal into text;

determining private information requested by the ARS server among at least one previously stored private information of the user, based on the converted text; and transmitting the determined private information to the ARS server depends on the biometric authentication.

13. The method of claim 12, further comprising:

indicating the at least one private information and displaying a previously stored private information list, in determining the private information requested by the ARS server.

14. The method of claim 13, wherein the determining of the private information includes:

identifying whether private information corresponding to the converted text is stored in a memory of the electronic device, after the private information list is displayed; and determining the private information corresponding to the converted text, when the private information corresponding to the converted text is stored in the memory.

15. The method of claim 14, further comprising:

determining the private information in response to a user input for selecting one private information in the displayed private information list, when the private information corresponding to the converted text is not stored in the memory.

16. The method of claim 15, further comprising:

updating the private information list based on the private information corresponding to the user input.

17. The method of claim 13, wherein the displaying of the private information list includes:

identifying an identification number of the ARS server; and displaying the private information list corresponding to the identification number.

18. The method of claim 12, further comprising:

displaying the determined private information in character form.

19. The method of claim 12, wherein performing biometric authentication comprises:

sensing biometric information of the user using a sensor of the electronic device; and comparing the sensed biometric information with previously stored biometric authentication information.

20. The method of claim 12, wherein the biometric authentication is automatically performed when the call connection procedure is initiated or when the call connection procedure is completed.

* * * * *